(12) United States Patent
Giannopoulos

(10) Patent No.: US 6,414,858 B1
(45) Date of Patent: Jul. 2, 2002

(54) MULTI-MODE PULSE-WIDTH MODULATOR FOR POWER CONTROL APPLICATIONS

(75) Inventor: Demetri Giannopoulos, Norwalk, CT (US)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/989,246

(22) Filed: Nov. 20, 2001

(51) Int. Cl.$^7$ .............................................. H02M 1/12
(52) U.S. Cl. ............................. 363/41; 703/18; 700/40
(58) Field of Search ............................. 700/40; 703/18; 363/41

(56) References Cited

U.S. PATENT DOCUMENTS 5,343,016 A * 8/1994 Davis et al. ............. 219/130.1
5,481,451 A    1/1996 Kuwahara ................... 318/801
6,157,093 A * 12/2000 Giannopoulos et al. ....... 307/38

* cited by examiner

*Primary Examiner*—Shawn Riley
(74) *Attorney, Agent, or Firm*—Steven R. Biren

(57) ABSTRACT

A multi-mode modular pulse-width-modulator capable of outputting low-speed and high-speed control signals is presented. The operation of the modulator is determined by parameters that are stored within the modulator and provide for high-speed updating and control capability in response to changes in voltage or current. In one mode, an update and control signal is generated based on timing parametric data stored in a local memory. In a second mode, an update and control signal is generated based on timing parametric data that provided by an external input device. Furthermore, control variables are also stored locally which control the position of switches, which alter signal paths within the modulator.

30 Claims, 8 Drawing Sheets

COUNT_pulse

PULSEGEN_5

COUNT_del

PULSEGEN_2

COUNT_pulse

PWMOUT

MULTI-MODE PULSE-WIDTH MODULATOR FOR POWER CONTROL APPLICATIONS

RELATED APPLICATION

This application relates to commonly assigned:

U.S. patent application Ser. No. 09/406,648, entitled, MODULAR MASTER-SLAVE POWER SUPPLY CONTROLLER, filed, Sep. 22, 1999; and U.S. patent application Ser. No. 09/781,473 entitled DUAL-MODE PULSE-WIDTH MODULATOR FOR POWER CONTROL APPLICATIONS, filed Feb. 12, 2001.

FIELD OF THE INVENTION

The present invention relates to the field of control systems. More specifically, this invention relates to modular power control systems using pulse-width control modulators.

BACKGROUND OF THE INVENTION

FIG. 1 illustrates a conventional switching power module. As illustrated, an alternating (AC) voltage is input into power conversion module 110, which produces a direct (DC) output voltage, Vo. Output voltage, Vo, is input to feedback compensation control circuit 150, which monitors the value of output voltage Vo and adjusts the internal parameters of power conversion module 110 to maintain Vo relatively constant. The processing of feedback compensation control circuit 150 is well known in the art and may be implemented in special-purpose circuits, such a Field Programmable Gate Arrays (FPGAs) or Application Specific Integrated Circuits (ASICs).

The use of Application Specific Integrated Circuits to implement the control of power supplies is well known in the art. ASICs can perform the functions of a variety of discrete components on a single Integrated Circuit (IC). This is advantageous as the size of the controller and the overall size of the power supply can be reduced. Also, in large quantity, the cost of an ASIC is significantly less than the cost of discrete components that are required to perform the same functions. Hence, the overall cost and physical size of power supply units is reduced when ASIC technology is employed.

ASICs may be custom-made for the application or may be "off-the-self" components. Custom-made ASICs are expensive and time-consuming to develop. Since the initial development cost for custom-made ASICs may be high, these devices are used in high volume applications. In such cases the development costs can be spread-out over the price of all the units sold. In addition, custom-made ASICs are typically designed to operate with a particular type of component or a component manufactured by a particular manufacturer.

Off-the-shelf ASICs are typically preprogrammed with known functions and interface to external devices, components or other hardware, in order to use them in a designated application. The external components interface the off-the-shelf ASIC to other devices or components. The use of external components, however, is disadvantageous as their use increases the cost and the size of the power supply. It is further disadvantageous when components are changed as the interface and the ASIC may also have to be changed.

One method of creating power supply controllers using off-the-shelf components is to distribute processing among generic component blocks. The generic component blocks can consist of programmable micro-controllers that communicate operational commands to control devices, such as Pulse Width Modulators (PWM), over a data bus. Pulse Width Modulators are routinely included as peripherals in micro-controller based integrated circuits. Timing parameters, such as frequency, i.e., period, on-time, off-time, etc., which are used to control the output voltage level are stored in registers accessible by a micro-controller. Power supply controllers are well known in the art.

FIG. 2 illustrates a conventional modular digital power supply controller 150 comprised of a master unit 200 and at least one slave unit 210a, 210b. As illustrated, master unit 200 is composed of processor 202, memory 204 and communication interface 206. Analog-to-digital (A/D) converter 201 may optionally be included for conversion of analog signals to digital form for processing by processor 201. Slave units 210a, 210b are composed of communication interface 222, PWM generator 218, registers 212 and micro-controller or DSP 214. Analog-to-digital (A/D) converter 216 may optionally be included for conversion of analog signals to digital form for processing. PWM generators 218 are routinely included as peripherals in micro-controller integrated circuits. In such cases, timing parameters, e.g., frequency, on-time, off-time, etc., can be are stored in register 212, These values can be set in register 212 by local micro-controller 214 or remotely by processor 202 over communication link 208.

Remotely controlled operation of PWM is, however, limited because of bandwidth constraints. In voltage-mode control applications, the control of power module 150, of FIG. 1, by PWM 218 is in the order of few hundred or a few thousand hertz. In this case, the rate of updating the register content is relatively low, hence, the limited bandwidth of micro-controller 202, such as, 80C51-based micro-controllers, or data bus 208 is sufficient for updating the registers stored, for example, in slave unit 210a. On the other hand, in current-mode control applications the PWM output is required to respond within a few hundred nanoseconds. Being bandwidth limited, the earlier described distributed power supply controller cannot respond within such a short time period. Hence, there is in a need in the art to provide a means for high-speed updating of pulse width modulator parameters that does not require expensive high-speed components, control signals or increased bandwidth

SUMMARY OF THE INVENTION

A multi-mode pulse width modulator (PWM) capable of exercising control signals in voltage-controlled, i.e., low-speed, and current-controlled, i.e., high-speed, power supply controllers is presented. The pulse width modulator, responsive to initial or slowly updated control signals can initiate control signals that provide either a slow-speed or high-speed changes. In one aspect of the invention, where the PWM is in communication with a relatively slow processor over a band-limited digital communication link, the PWM can internally generate a high-speed control signal in response to a rapidly changing input signal. In this aspect of the invention, the modular construction of power supply controller provides flexibility and interchangeability without incurring the cost of custom-made integrated circuit development.

Figure 1:
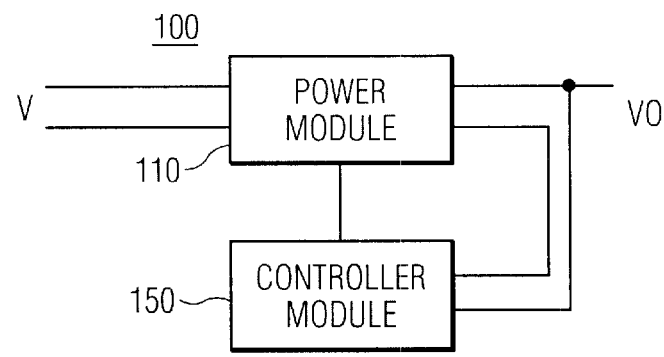
FIG. 1 illustrates a block diagram of a conventional switching power supply.
Figure 2:
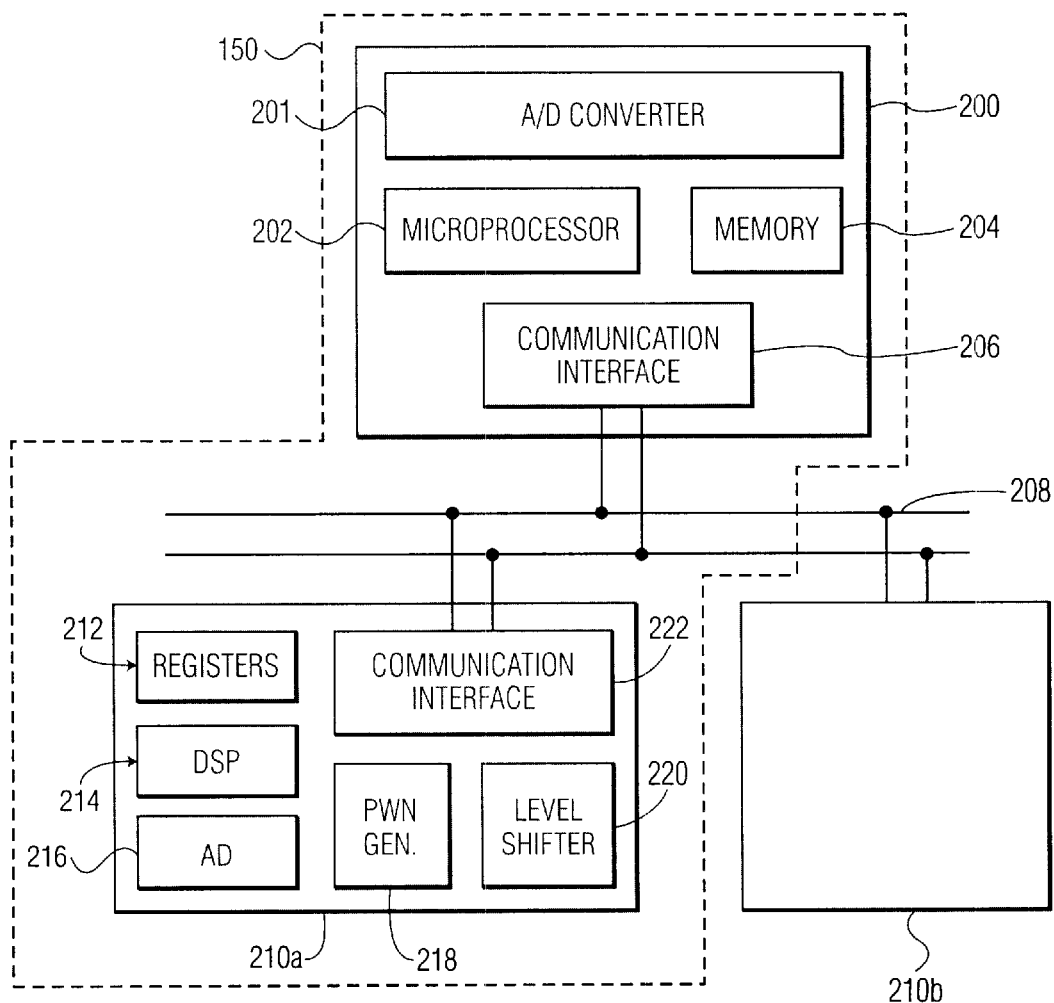
FIG. 2 illustrates a conventional distributed power supply feedback compensation control circuit.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE INVENTION

Figure 3A:
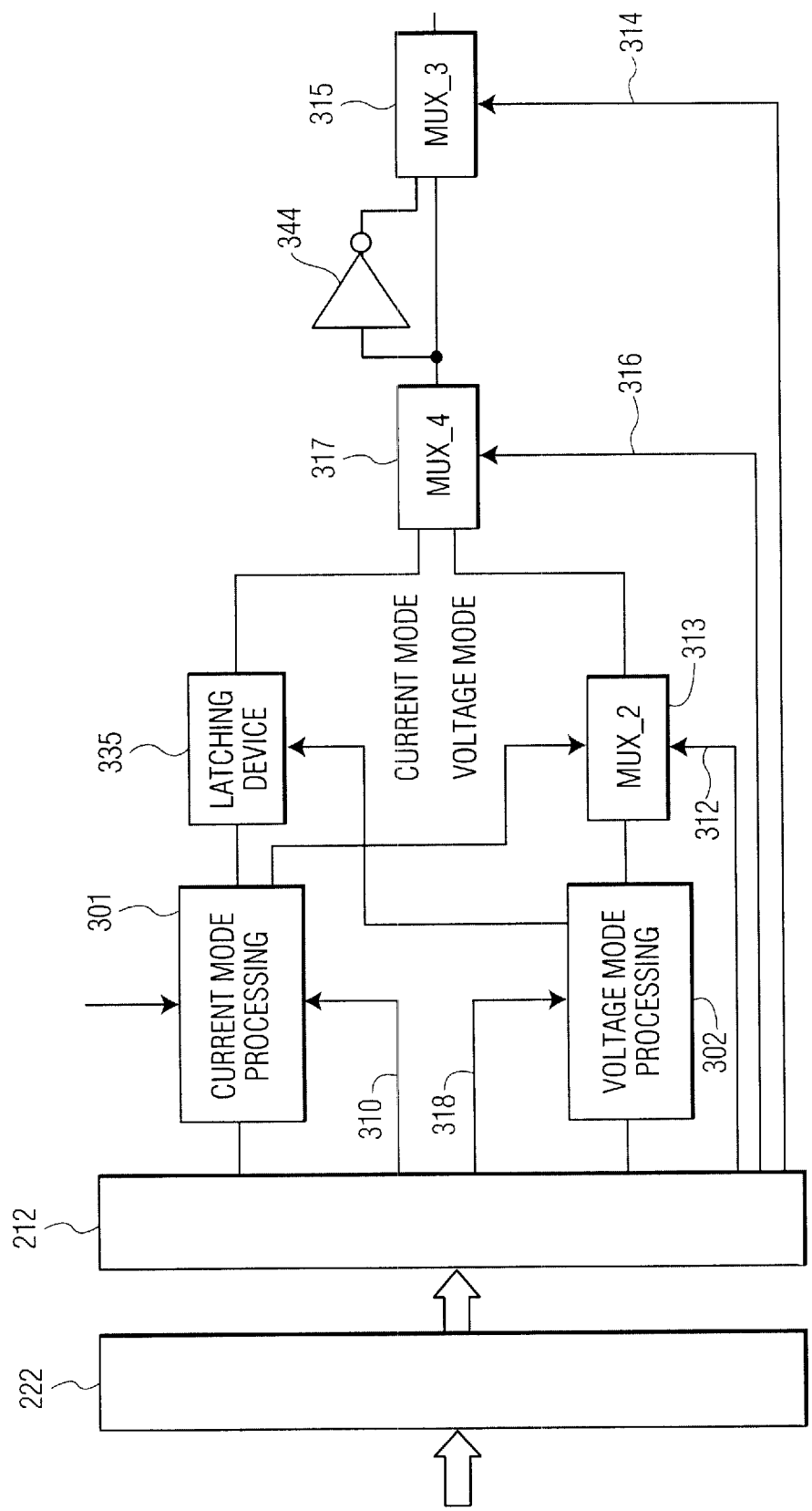
FIG. 3a illustrates a block diagram of an exemplary multi-mode pulse width modulator in accordance with the principles of the invention.

FIG. 3a illustrates a block diagram of an exemplary remote multi-mode pulse width modulator (PWM) 210a in accordance with the principles of the present invention. In this illustrative block diagram, command signals are input across a network (not shown) and received by communication interface 222 and stored in register unit 212. Input command may, be timing parameters, configuration commands, etc., which configure remote PWM module 210a into a known configuration. In one aspect, remote PWM module 210a can be configured into a current mode processing 301 or a voltage mode processing 302. Both current mode processing 301 or voltage mode processing 302 are capable of operating as in variable frequency or fixed frequency modes. In the current mode processing latching device 335 is directed to select between variable frequency current and fixed frequency current operation as will be explained in more detail with regard to FIG. 3b. In the voltage mode processing multiplexer/switch 313 (i.e., Mux_2) is directed to select between variable frequency voltage and fixed frequency voltage operation by control signal 312, which may be stored in register unit 212, and will be explained in more detail in regard to FIG. 3b. Multiplexer/switch Mux_4, 317 is directed to select between the cur-rent mode operation or the voltage mode operation by control signal 316. Multiplexer/switch Mux_3, 315 is directed to select between the output of Mux_4 317 or the output of the intervening inverter stage by control signal 314.

Figure 3B:
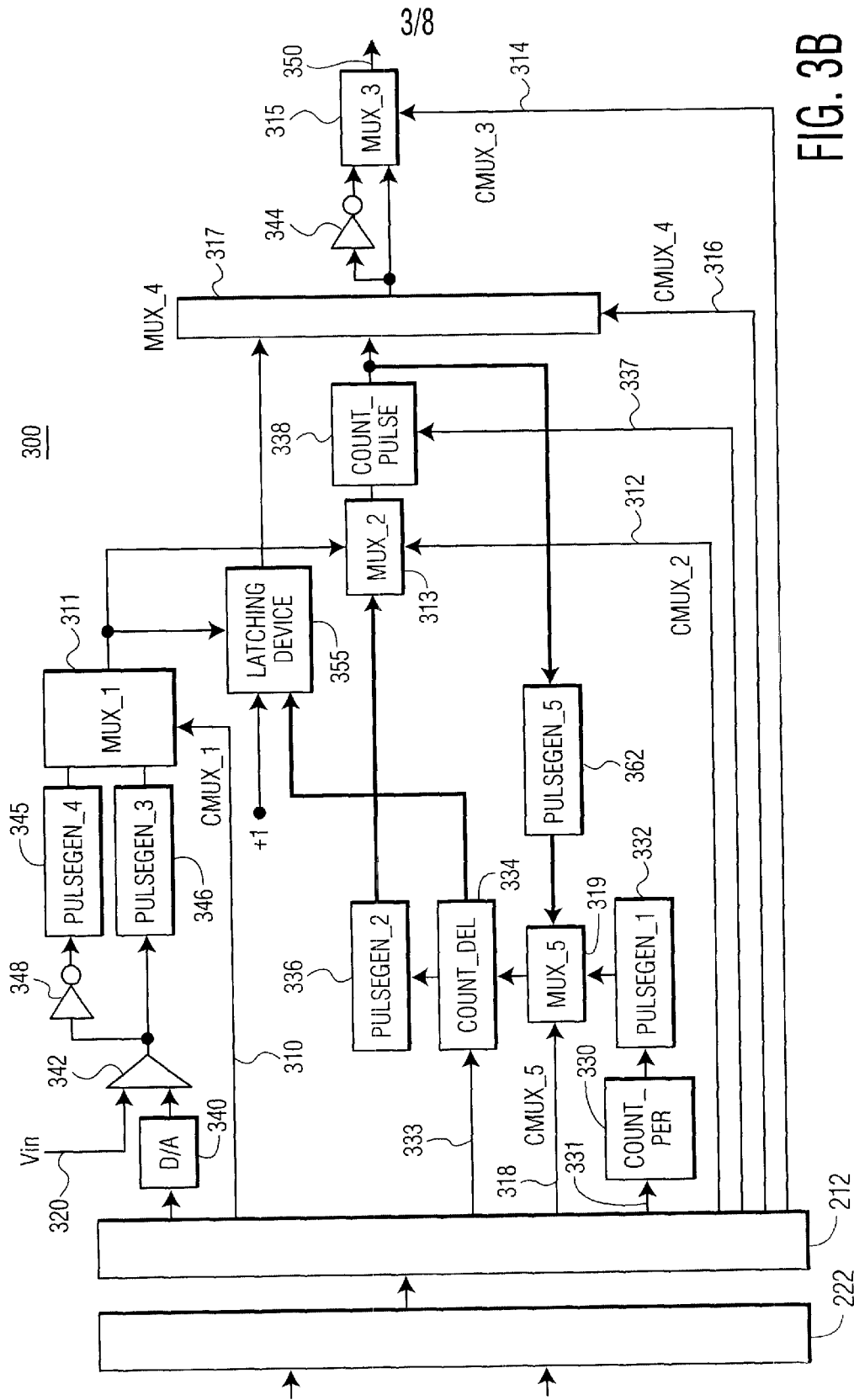
FIG. 3b illustrates a detailed block diagram of an exemplary multi-mode pulse width modulator in accordance with the principles of the invention.

FIG. 3b illustrates an exemplary embodiment 300 of a multi-mode pulse width modulator (PWM) 210a in accordance with the principles of the present invention. In this exemplary embodiment control signals 310, 312, 314, 316 and 318, respectively labeled CMux_1, CMux_2, CMux_3, CMux_4 and CMux_5, are stored in control register 212. Control signals CMux_1 through CMux_5 are used to program the functionality of PWM 300 by controlling signal paths, i.e., the state of multiplexers/switches 311, 313, 315, 317 and 319, respectively, through PWM 300. In one aspect of the invention, control signals Mux_1, Mux_2, Mux_3 Mux_4 and Mux_5 may be set by an external microcontroller 212 (not shown) via communication link 208 and interface 222. In a second aspect of the invention, and the one discussed herein, control signals CMux_1, CMux-_2, CMux_3, CMux_4, and CMux_5 are pre-stored in registers or memory 212. In this case, the values in the registers or memory 212 can be pre-set by an external microcontroller or may be pre-loaded by pre-programming memory 212.

Each of the individual modes of operation of a multi-mode PWM will now be disclosed with regard to the illustrated exemplary circuit shown in FIG. 3b. In fixed frequency voltage-control mode, generator 330, receives at least one known value, 331, which is stored in control register 212, and generates a signal, herein, labeled Count_per. In an alternate embodiment signal Count_per can be synchronized to a fixed external signal (not shown). Pulse generator 332, receiving signal Count_per generates signal Pulsegen_1 responsive to the transitions of signal Count_per. Signal Pulsegen_1, hence, is representative of a transition of signal Count_per from one fixed state to a second fixed state. Pulse generator 332, for example, may be a "one-shot" pulse generator that generates a pulse upon detection of transition of an input signal. In one embodiment of the invention, pulse generator 332 can generate signal Pulsegen_1 on a leading edge of signal Count_per. In an alternate embodiment, pulse generator 332 can generate signal Pulsegen_1 on a trailing edge of signal Count_per.

Signal Pulsegen_1 is next input to multiplexer/switch 319, (i.e., Mux_5). In this mode of fixed frequency voltage operation, Mux_5, 319 is directed by control signal 318 (CMux_5) to select input signal Pulsegen_1. The output of Mux_5, 319 is then input to generator 334.

Generator 334 receiving at least one input value 333 stored in control register 212 and the output of Mux_5, 319 generates signal Count_del. Generator 334 generates signal Count_del synchronously with the output of Mux_5, 319, i.e., signal Pulsegen_1, and with a known pulse width set by the received at least one known value stored in register 212. Signal Count_del is next input to Pulse generator 336, which generates a pulse signal, labeled Pulsegen_2 responsive to the transition of signal Count_del. In one embodiment of the invention, pulse generator 336 can generate signal Pulsegen_2 on a tailing edge of signal Count_del. Alternatively, pulse generator 336 can generate signal Pulsegen_2 on a leading edge of signal Count_del. Similar, to generator 332, generator 336 may be a "one-shot" generator.

Signal Pulsegen_2 is then input to multiplexer/switch MUX_2, 313, which under to the direction of control signal CMUX_2, 312 directs signal Pulsegen_2 to pulse generator 338. Pulse generator 338 next generates signal Count_pulse in response to the output of Mux_2, 313 and with a known pulse width determined by at least one known value 337 stored in register 212.

Signal Count_pulse is next applied to multiplexer/switch Mux_4, 317. Under the direction of control signal CMUX_

4, 316, switch Mux_4, 317 is directed, in this case, to pass signal Count_pulse to multiplex/switch Mux_3, 315.

In one aspect of invention, multiplex/switch Mux_3, 315 can be directed by control signal CMux_3, 314 to select signal Count-pulse as the output of PWM 210a (i.e., signal PWMOUT 350). In another aspect of the invention, signal Count_pulse can be inverted by inverter 344 and multiplexer/switch MUX_3, 315 can be directed by control signal CMUX_3, 314 to select an inverted form of signal Count_pulse as representative of signal PWMOUT 350. Signal PWMOUT 350 controls the switching frequency of PWM 210a.

Figure 4:
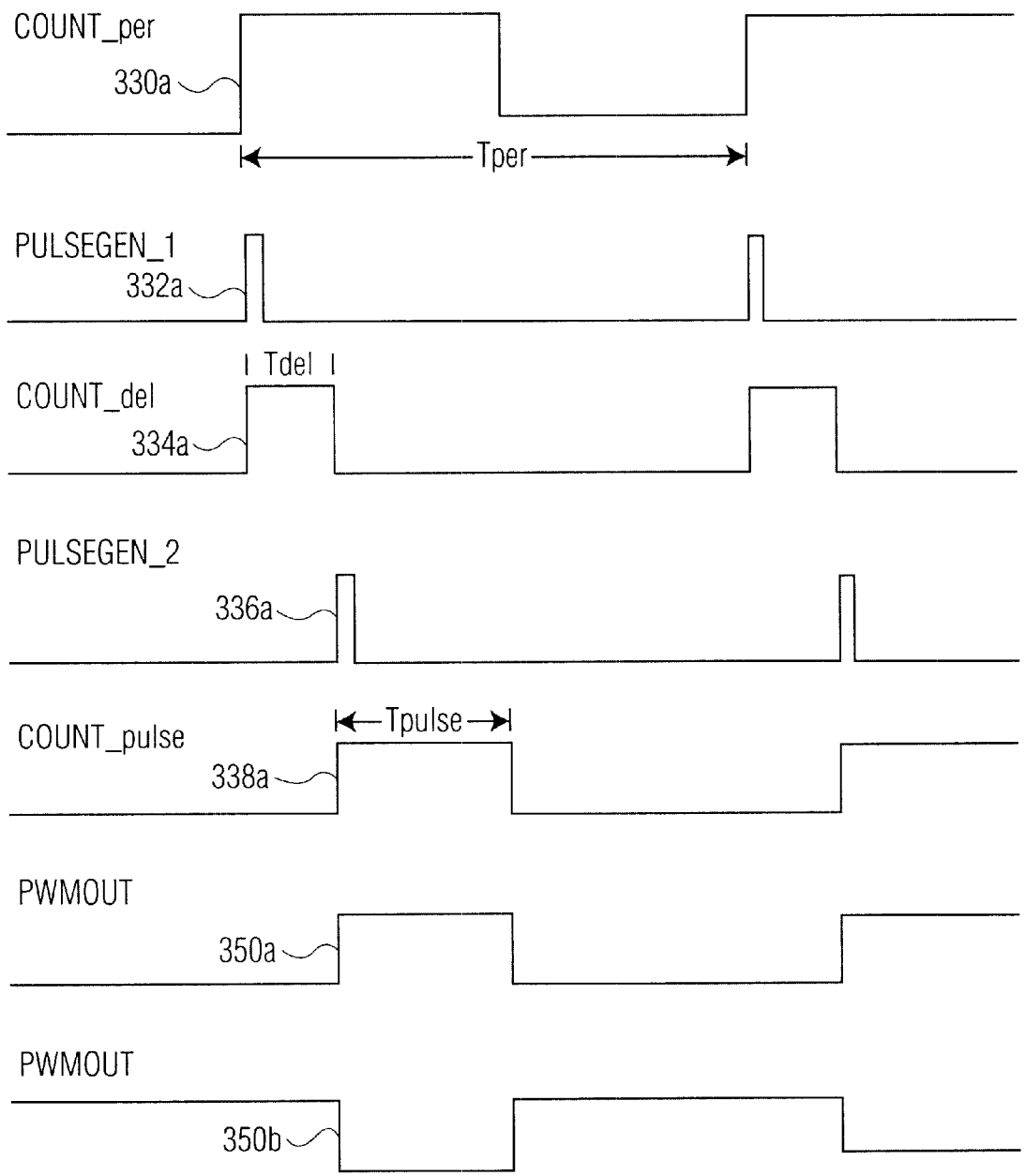
FIG. 4 illustrates timing diagrams of signal waveforms generated by the exemplary pulse width modulator depicted in FIG. 3b operating in a fixed frequency voltage-control mode.

FIG. 4 illustrates timing relations among the signals used to process fixed frequency voltage-control mode of PWM 300. In this exemplary timing diagram, signal Count_per, represented as signal 330a, is a square wave having a known, fixed period, i.e., frequency, represented as $T_{per}$. Period $T_{per}$ is representative of at least one known value stored in register 212. Signal Pulsegen_1, represented as signal 332a, is generated responsive to the transitions of signal Count_per. Signal 332a can be generated, as illustrated, on a leading edge of signal 330a, or, as would be understand in the art, can be generated on a tailing edge of signal 330a. Signal Count_del, represented as signal 334a, is generated responsive to the transitions of signal 332a and has a pulse duration representative of at least one known value, represented as $T_{del}$. The at least one known value representative of duration, $T_{del}$, is stored in register 212. In one embodiment of the invention can be loaded through communication interface 222 over communication link 208. In a second embodiment of the invention, duration $T_{del}$ can be pre-loaded in register 212.

Signal Pulsegen_2, represented as signal 336a, is generated responsive to the transitions of signal Count_del. In this illustrative example, signal 336a is generated on a trailing edge of signal 334a. As would be understood, signal 336a may alternatively be generated responsive to a leading edge of signal 334a.

Signal Count_pulse, represented as signal 338a, is next generated responsive to the transitions of signal 336a and has a pulse duration represented as $T_{pulse}$, which is representative of at least one value stored in register 212. Duration $T_{pulse}$ in one aspect of the invention can be loaded through communication interface 222 over communication link 208. In a second aspect of the invention, duration $T_{pulse}$, can be pre-loaded in register 212.

Signal PWMOUT, as represented by signal 350a, in this illustrative example, corresponds to the illustrated signal Count_pulse 338a. In a second aspect of the invention, signal PWMOUT 350 may be selected as an inverted signal 338a, which is illustrated as signal 350b.

Return now to FIG. 3b, the variable frequency current mode of operation of the exemplary PWM 300 illustrated is more fully disclosed. In this mode, a digital representation of a reference voltage is stored in control register 212. As previously discussed, the value stored can be pre-stored in register 212 or can be received via communication link 208 and stored in register 212. The stored digital representation of reference voltage is input to Digital-to-Analog (D/A) converter 340. D/A converter, as is known, converts a digitally represented value into a comparable analog value using known scaling factors. Details of D/A conversion are well known in the art and need not be discussed herein. The converted output voltage level of D/A converter, referred to as Vref, is then input to comparator 342.

Signal 320, labeled herein as $V_i$, is also input into comparator 342. Signal $V_i$, is representative of a current passing through a control transistor. Signal 320 is a high-speed signal as it is changing on each cycle and must be evaluated and processed in a short period of time.

The output of comparator 342 is next input to pulse generator 346. Pulse generator 346 generates signal Pulsegen_3, when, in this illustrated case, signal $V_i$ 320 is greater than reference voltage, Vref. The output of comparator 342 is also input to inverter 348, which is used to reverse the sense of the input signal. The output of inverter 348 is input to pulse generator 345, which generates signal Pulsegen_4.

Signals Pulsegen_3 and Pulsegen_4 are next applied to multiplexer/switcher, 311, labeled Mux_1. Control signal, CMUX_1, 310 determines whether signal Pulsegen_3 or Pulsegen_4 is selected for further processing. The signal selected by multiplexer/switch 311 is next applied to multiplexer/switch 313, (i.e., Mux_2). Mux_2, 313, is directed, in this current mode of operation, by control signal CMux_2, 312 to select the output of Mux_1, 311.

The selected output of Mux_1, 311, is then applied to generator 338, which generates signal Count_pulse as previously discussed. Signal Count_pulse is next applied to multiplexer/switch Mux_4, 317. Under the direction of control signal CMUX_4, 316, switch Mux_4, 317 is directed to pass signal Count_pulse to multiplex/switch Mux_3, 315. As previously discussed, Mux_3, 315 is directed by control signal CMux_3, 314, to select signal Count_pulse or its inverse as the output signal PWMOUT 350a.

Figure 5:
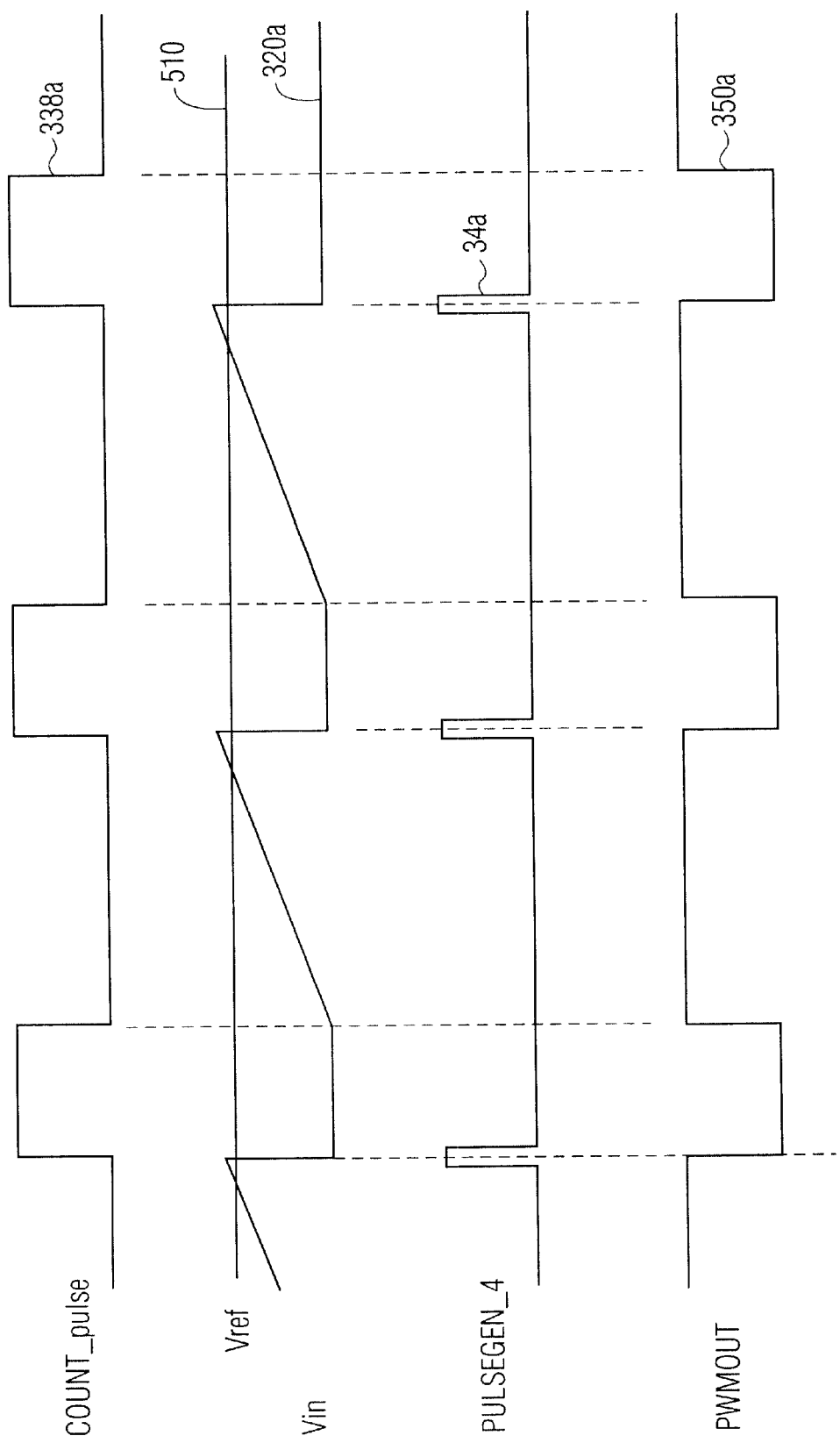
FIG. 5 illustrates timing diagrams of signal waveforms generated by the exemplary pulse width modulator depicted in FIG. 3b operating in a variable frequency current-control mode.

FIG. 5 illustrates exemplary timing signals in accordance with one embodiment of variable frequency current-mode operation of the circuit illustrated in FIG. 3b. In this embodiment, reference voltage, Vref, 510, is illustrated as a steady reference value, which may be stored in digital form in register unit 212. Voltage $V_i$, labeled 320a, is illustrated as a voltage having a triangular waveform, which is representative of a raising and falling voltage as a power transistor is turned off and on.

Signal Pulsegen_3, represented as signal 546a, is generated, in this example, when voltage $V_i$, 320a, is greater than reference voltage, Vref, 510. With appropriate selection by control signals CMux_1, 310 and CMux_2, 312, signal Pulsegen_3 is applied to pulse generator 338 through multiplex/switches Mux_1, 311 and Mux_2, respectively. Pulse generator 338, as previously discussed, generates signal Count_pulse, represented as signal 338a, responsive to the input signal and having a pulse duration represented as $T_{pulse}$. Signal Count_pulse 338a, in this illustrated case, is selected as the output signal PWMOUT 350a.

Returning now to FIG. 3b, the operation of variable frequency voltage mode of the exemplary PWM 300 illustrated is more fully discussed. In this aspect of the invention, signal Count_pulse is concurrently applied to Mux_4, 317 and generator 362. Generator 362 generates a signal, Pulsegen_5, responsive to the transitions of signal Count_pulse. Signal Pulsegen_5 is next applied to multiplexer/ switch Mux_5, 319, which is directed by control signal CMux_5, 318, to select signal Pulsegen_5 as an input signal to generator 334. Generator 334, in this case, generates signal Count_del, responsive to the input signal and having a pulse width determined by the at least one value 333, which is stored in register/memory unit 212. Signal Count_del is next input into generator 336, which generates signal Pulsegen_2. as previously discussed. Signal Pulsegen_2 is then applied to multiplexer/switch 313, which is directed by control signal CMux_2, 312 to select signal Pulsegen_2, in this case. The selected signal Pulsegen_2 is then applied to generator 338 to generate signal Count_pulse. As discussed previously, signal Count_pulse is then selected by multiplexer/switch 317 to be representative of the output of PWM 210a, i.e., signal 350a.

Figure 6:
FIG. 6 illustrates timing diagrams of signal waveforms generated by the exemplary pulse width modulator depicted in FIG. 3b operating in a variable frequency voltage-control mode.
Figure 6:
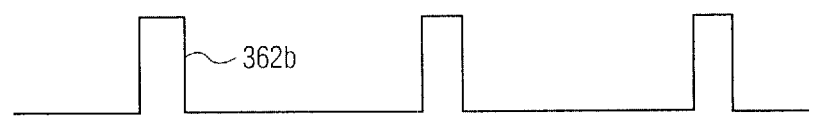
Figure 6:
Figure 6:
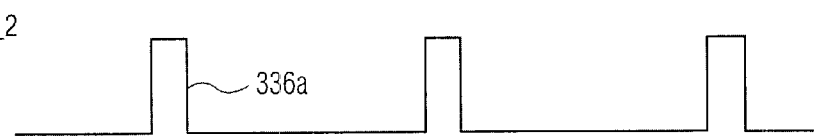
Figure 6:
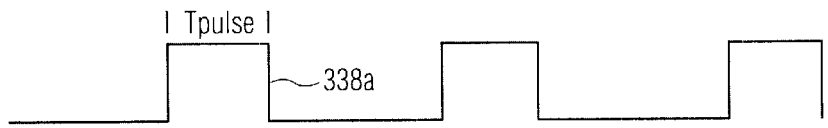
Figure 6:

FIG. 6 illustrates exemplary timing signals in accordance with the variable frequency voltage-mode operation of the exemplary circuit illustrated in FIG. 3b. In this example, signal Pulsegen_5, represented at 362a is generated in relation to the transitions of signal Count_pulse, 338a. In this case, Pulsegen_5 is generated on the tailing edge of signal Count_pulse, 338a. It will be appreciated that signal Pulsegen_5 could be similarly generated on the leading edge of signal Count_pulse. Signal Count_del 334a is next generated in relation to signal Pulsegen_5. Signal Count_del 334a, as previously discussed, has a known pulse width, represented as $T_{del}$, which is determined from information stored in register/memory unit 212. Signal Pulsegen_2 336a is next generated in response to the transitions of signal Count_del 334a. Signal Pulsegen_2 is then applied to generator 338, which generates signal Count_pulse with a known pulse width.

Return now to FIG. 3b, the fixed frequency current mode of operation of exemplary PWM 300 is more fully disclosed. In this operational mode, signal Count_del is applied to a clock input of latching device 335 and the output of Mux_1, 311, is applied to a reset input of latching device 335. A second input of latching device is held at a logic high value. The output of latching device 335 is then selected as the output of the PWM 210 by Mux_4, 317 and Mux_3, 315.

Figure 7:
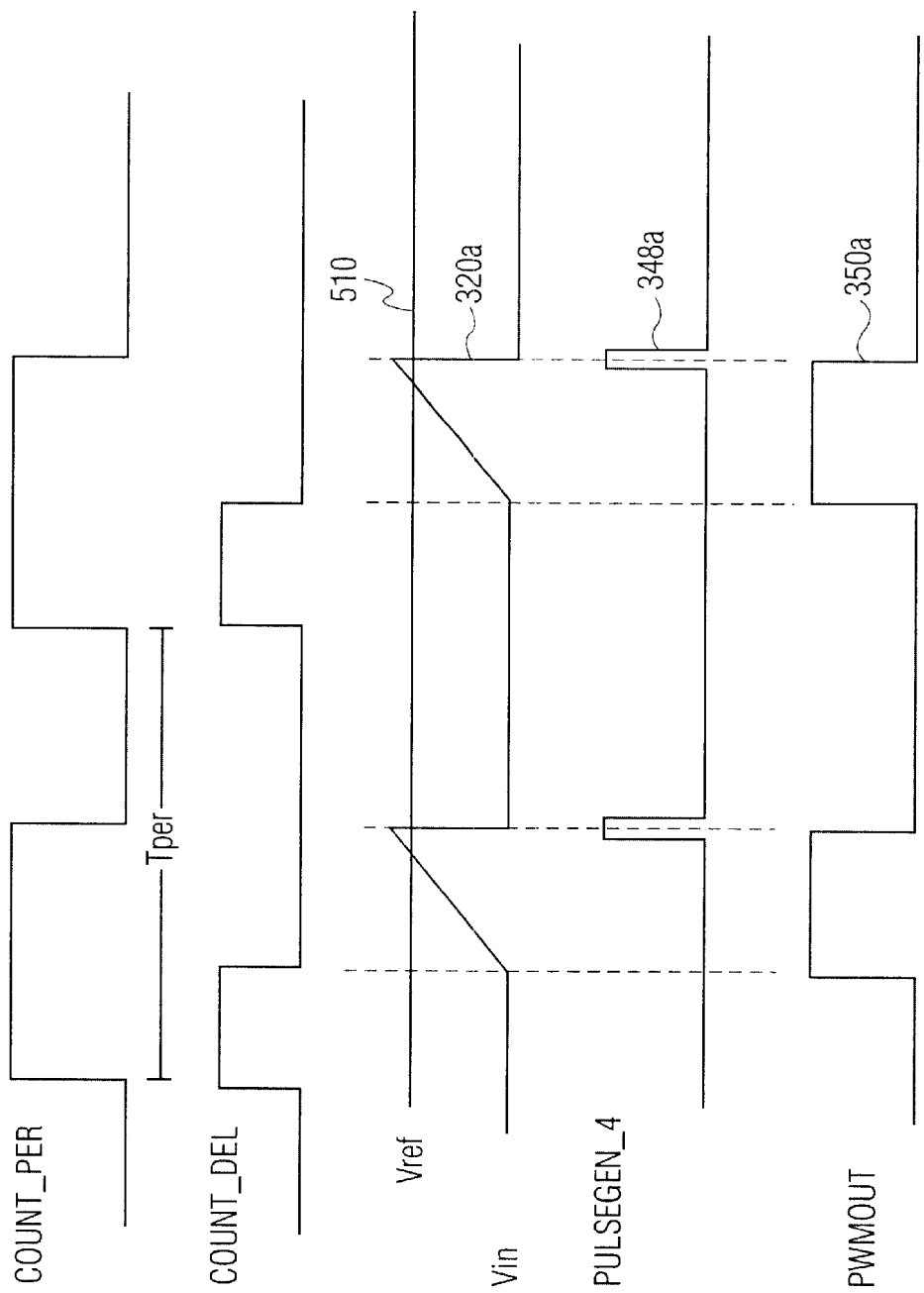
FIG. 7 illustrates timing diagrams of signal waveforms generated by the exemplary pulse width modulator depicted in FIG. 3b operating in a fixed frequency current-control mode.

FIG. 7 illustrates an exemplary timing diagram in accordance with the principles of the invention. In this illustrative example, when Vin 320a exceeds a reference voltage Vref, 510, the signal Pulsegen_4, 348a, is selected by Mux_1, 311. The output is then applied to the reset port of latching device 335, which causes the output of latching device 335 to be set to zero. However, at the next clock pulse, as determined by signal Count_del, the output of latching device is reversed, as is shown here as a logical "high" value. The output of latching device 335 is next applied to Mux_4, 317 which controlled by control signal C_Mux_4, selects the output of latching device 335 as the output of PWM 210, i.e., signal 350.

Figure 8:
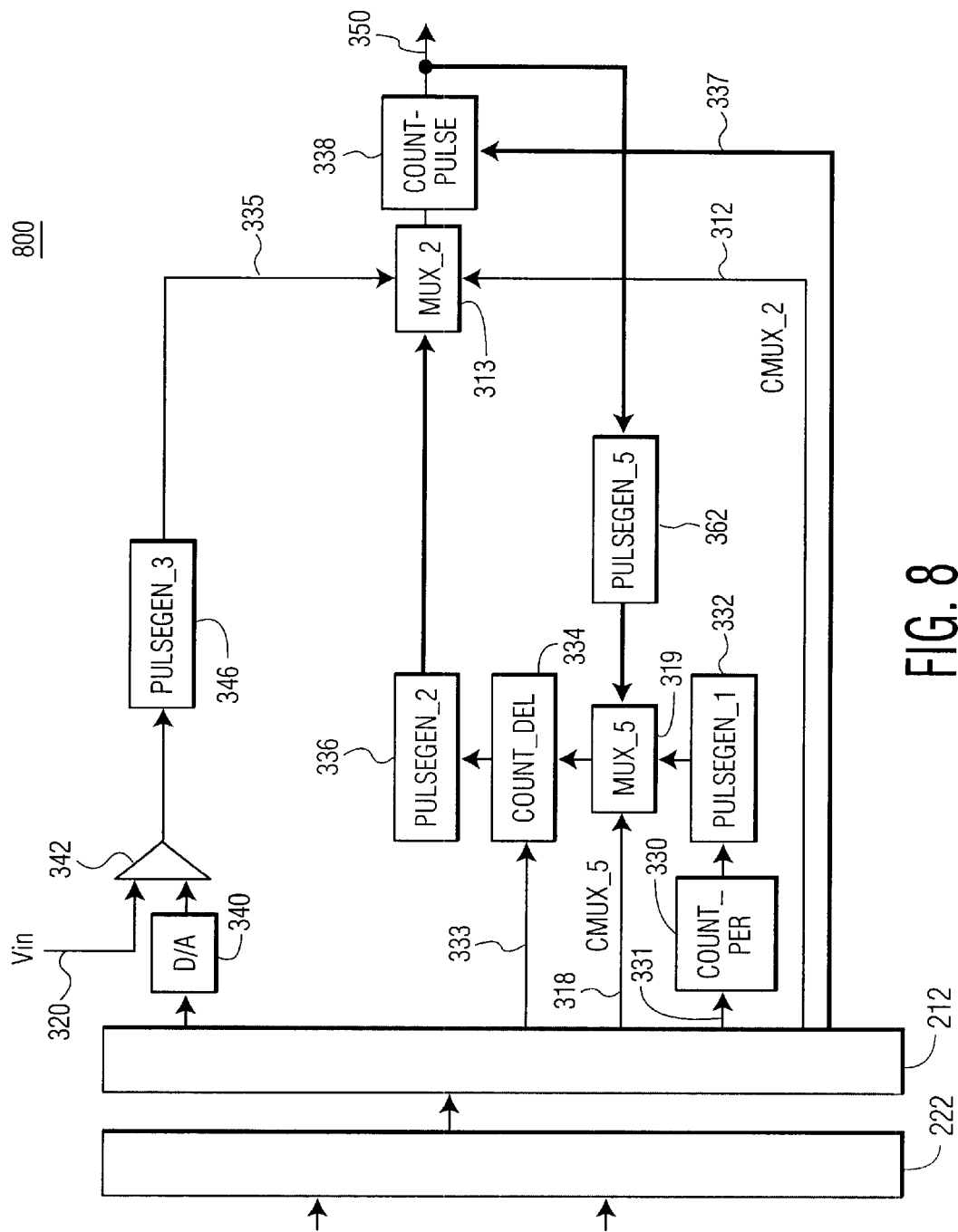
FIG. 8 illustrates another exemplary embodiment of a remote PWM in accordance with the principles of the present invention.

Although the multi-mode PWM depicted in FIG. 3b has been shown capable of performing both fixed- and variable-frequency current and voltage operation, it would be appreciated that a voltage only or current only PWM can be constructed by selectively including only those components applicable to a specific mode of operation in the exemplary multi-mode PWM shown in FIG. 3b. Accordingly, fixed-frequency only or variable frequency only modes of operations may be constructed in accordance with the principles of the invention by removing components from the exemplary multi-mode PWM shown in FIG. 3b. FIG. 8 illustrates a second exemplary embodiment of a multi-mode PWM 800 is accordance to the principles of the present invention. In this embodiment, PWM 800 is operable for fixed and variable voltage control and variable current control operation only.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. For example, it will be appreciated that in one aspect of the invention, control signals or variables CMux_1 through CMux_5, and known time values or variable $T_{per}$, $T_{del}$, and $T_{pulse}$ can be set by controller 200 by an internal bus when register 212 and controller 202 are fabricated on the same chip or wafer. Furthermore, control signals CMux_1 through CMux_5, and known time values $T_{per}$, $T_{del}$, and $T_{pulse}$ can be preset in register 212.

It is expressly intended that all combinations of those elements and/or method steps which perform substantially the same function is substantially the same way to achieve the same results are within the scope of the invention. Substitutions of elements from one described embodiment to another are also fully intended and contemplated.

I claim:

1. A multi-mode programmable pulse width modulator circuit for generating a regulating signal to regulate a power supply output voltage comprising:
   a memory containing a plurality of control variables and a plurality of time variables;
   a first signal generating device for generating a plurality of first signals having characteristics determined by at least one of said time variables;
   a second signal generating device for generating a second signal based on at least one of said control variables and an external signal;
   a selection device, in communication with said memory, responsive to at least one of said control variables for selecting between at least one of said first signals and said second signal;
   a third pulse generating device responsive to at least one of said time variable and said selected signal, for generating a third signal, wherein said third signal is operative as said regulating signal.

2. The circuit as recited in claim 1 further comprising;
   an inverter to receive and invert said third signal; and
   a second selection device, in communication with said inverter and with said memory, responsive to at least one of said control variables, for selecting between said third signal and its inverse, wherein said selected signal is operative as said regulating signal.

3. The circuit as recited in claim 1 further comprising:
   a latching device responsive to said second signal and at least on of said first signals, said latching device operable to provide a fourth signal; and
   a third selection device in communication with said memory and responsive to at least one of said control variables, for selecting between said third signal and said fourth signal, wherein said selected signal is operative as said regulating signal.

4. The circuit as recited in claim 3 further comprising;
   an inverter to receive and invert said third signal; and
   a second selection device, in communication with said inverter and with said memory, responsive to at least one of said control variables, for selecting between said selected signal and its inverse, wherein said selected signal is operative as said regulating signal.

5. The circuit as recited in claim 1 wherein said first signal generating device comprises:
   a first pulse generating device, in communication with said memory and responsive to an input signal and at least one of said time variables, for generating at least one of said first signals; and
   a second pulse generating device responsive to said at least one first signals generated by said first pulse generator for generating a second at least one first signals.

6. The circuit as recited in claim 5 further comprising:
a third pulse generating device in communication with said memory and responsive to at least one of said time variables operable to generate a signal having a known period;
a fourth selection device, in communication with said memory and responsive to at least one of said control variables operable for selecting between said third signal and said known period signal, wherein said selected signal is operable as said input signal.

7. The circuit as recited in claim 5 further comprising:
a third pulse generating device in communication with said memory and responsive to at least one of said time variables operable to generate a signal having a known period, wherein said known period signal is operable as said input signal.

8. The circuit as recited in claim 1 wherein said time variables are selected from a group comprising time period, delay time, pulse duration.

9. The circuit as recited in claim 1 wherein second signal generating device comprises:
a conversion device for converting said at least one control variable to a reference value;
a comparison device for receiving said reference value and said external signal and generating an output signal; and
at least one pulse generating device for receiving said comparison device output signal and generating a fifth signal.

10. The circuit as recited in claim 9 further comprising:
a second inverter to receive and invert said comparison device output signal;
at least one pulse generating device for receiving said inverted comparison device signal and generating a sixth signal; and
a fourth selection device, in communication with said memory, and responsive to at least one of said control variables, for selecting between said fifth signal and said sixth signal wherein said selected signal is operable as said second signal.

11. The circuit as recited in claim 1 further comprising:
a communication device for receiving data over a communication network.

12. The circuit as recited in claim 11 wherein said received data includes said at least one control variable.

13. The circuit as recited in claim 11 wherein said received data includes said at least one time variable.

14. The circuit as recited in claim 11 wherein said received data is loaded in said memory.

15. The circuit as recited in claim 1 wherein said at least one control variable is pre-loaded in said memory.

16. The circuit as recited in claim 1 wherein said at least one time variable is pre-loaded in said memory.

17. A multi-mode programmable pulse width modulator circuit for generating a regulating signal to regulate a power supply output voltage comprising:
a memory containing a plurality of control variables and a plurality of time variables;
a first pulse generator responsive to at least one of said time variables and an input signal, for generating at least one first signal;
a conversion device for converting said at least one control variable to a reference value;
a comparison device for receiving said reference value and said external signal and generating a comparison device signal when said external exceeds said reference signal;
a third pulse generator for receiving said comparison device signal and generating a second signal;
a first selection device, in communication with said memory, and responsive to at least one of said control variables for selecting between said second signal and at least one of said plurality of first signals;
a fourth pulse generating device responsive to the signal selected by said first selection device for generating a third signal;
a logic device responsive to one of said at least one first signals and said second signal, wherein said second signal resets said logic device and said one of at least one first signal provides a clock to said logic device, said logic device generating a fourth signal;
a second selection device in communication with said memory and responsive to at least one of said control variables, for selecting between said third signal and said fourth signal, wherein said selected signal is operative as said regulating signal.

18. The circuit as recited in claim 17 further comprising:
a second inverter, in communication with said second selection device, operable to receive and invert said second selection device selected signal; and
a third selection device, in communication with said second inverter, said third selection device and said memory and responsive to at least one of said control variables, for selecting between said second selection device selected signal and its inverse, wherein said selected signal is operative as a regulating signal.

19. The circuit as recited in claim 17 further comprising:
a second inverter to receive and invert said comparison device output signal;
at least one pulse generating device for receiving said inverted comparison device signal and generating an inverted comparison device signal; and
a fourth selection device, in communication with said memory, and responsive to at least one of said control variables, for selecting between said second signal and said inverted comparison device signal wherein said selected signal is operable as said second signal.

20. The circuit as recited in claim 5 further comprising:
a fifth pulse generating device in communication with said memory and responsive to at least one of said time variables operable to generate a signal having a known period;
a fifth selection device, in communication with said memory and responsive to at least one of said control variables operable for selecting between said third signal and said known period signal, wherein said selected signal is operable as said input signal.

21. The circuit as recited in claim 17 further comprising:
a fifth pulse generating device in communication with said memory and responsive to at least one of said time variables operable to generate a signal having a known period, wherein said known period signal is operable as said input signal.

22. The circuit as recited in claim 17 further comprising:
a communication device for receiving data over a communication network.

23. The circuit as recited in claim 22 wherein said received data includes said at least one control variable.

24. The circuit as recited in claim 22 wherein said received data includes said at least one time variable.

25. The circuit as recited in claim 22 wherein said received data is loaded in said memory.

26. The circuit as recited in claim 17 wherein said at least one control variable is pre-loaded in said memory.

27. The circuit as recited in claim 17 wherein said at least one time variable is pre-loaded in said memory.

28. The circuit as recited in claim 17 wherein said time variables are selected from a group comprising time period, delay time, pulse duration.

29. The circuit as recited in claim 17 wherein said logic device is a flip-flop.

30. The circuit as recited in claim 3 wherein said logic device is a flip-flop.

* * * * *